United States Patent
Alsadah

(10) Patent No.: US 11,294,340 B2
(45) Date of Patent: Apr. 5, 2022

(54) ONLINE SYSTEM IDENTIFICATION FOR DATA RELIABILITY ENHANCEMENT

(71) Applicant: Saudi Arabian Oil Company, Dhahran (SA)

(72) Inventor: Wed Hussain Alsadah, Saihat (SA)

(73) Assignee: Saudi Arabian Oil Company, Dhahran (SA)

( * ) Notice: Subject to any disclaimer, the term of this patent is extended or adjusted under 35 U.S.C. 154(b) by 343 days.

(21) Appl. No.: 16/397,344

(22) Filed: Apr. 29, 2019

(65) Prior Publication Data

US 2020/0341438 A1 Oct. 29, 2020

(51) Int. Cl.
| | | |
|---|---|---|
| G06F 11/30 | (2006.01) | |
| G05B 13/04 | (2006.01) | |
| E21B 47/12 | (2012.01) | |
| G05B 13/02 | (2006.01) | |

(52) U.S. Cl.
CPC ............ G05B 13/048 (2013.01); E21B 47/12 (2013.01); G05B 13/0265 (2013.01)

(58) Field of Classification Search
CPC .................................................. G05B 13/0265
See application file for complete search history.

(56) References Cited

U.S. PATENT DOCUMENTS

| | | | |
|---|---|---|---|
| 2013/0245949 A1* | 9/2013 | Abitrabi ................. | G01V 13/00 702/6 |
| 2015/0371151 A1 | 12/2015 | Georgescu et al. | |
| 2018/0136641 A1 | 5/2018 | Park et al. | |

FOREIGN PATENT DOCUMENTS

| | | |
|---|---|---|
| CN | 102269972 B | 12/2012 |
| CN | 106796577 | 5/2017 |
| CN | 107171314 | 9/2017 |
| KR | 20190014628 A | 2/2019 |

OTHER PUBLICATIONS

European Commission paper, titled "Real Time Data Validation", (2013).
S.M. Bunn et al., "The Energy-Efficiency Benefits of Pump-Scheduling Optimization for Potable Water Supplies," IBM Journal of Research and Development, (2009).
International Search Report and Written Opinion in Corresponding Patent Application No. PCT/US2020/030106 dated Jul. 7, 2020. 10 pages.

* cited by examiner

*Primary Examiner* — Phuong Huynh
(74) *Attorney, Agent, or Firm* — Leason Ellis LLP

(57) ABSTRACT

A system, a method, and a computer program for monitoring or controlling a field instrument in a pipeline, including receiving a plurality of process readings which originated from a plurality of remote terminal units that are distributed along a portion of the pipeline, analyzing the received plurality of process readings to determine a plurality of influencing process readings and a target process reading, assessing whether the target process reading includes bad data, and generating an estimated process reading or updating a parameter of a system model based on the plurality of influencing process readings and based on whether the target process reading includes bad data.

20 Claims, 10 Drawing Sheets

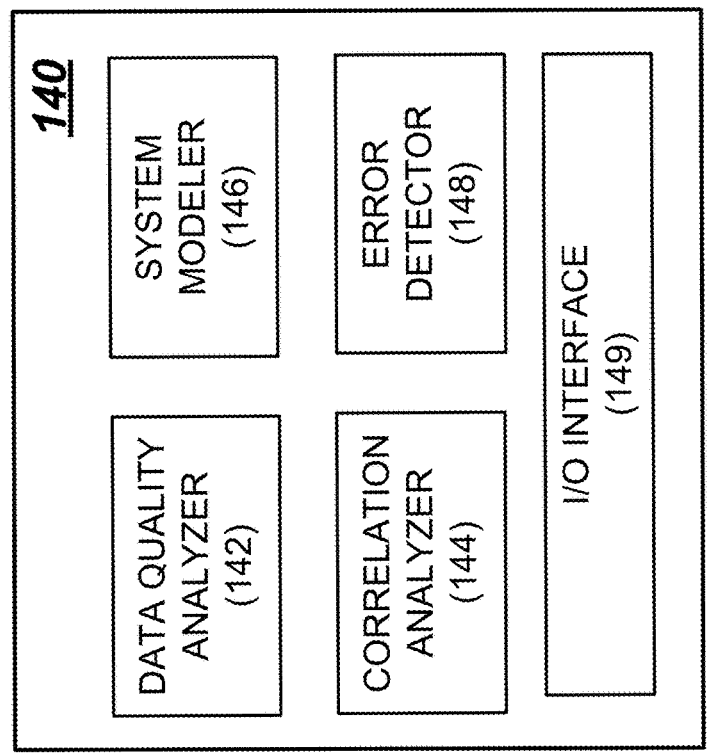
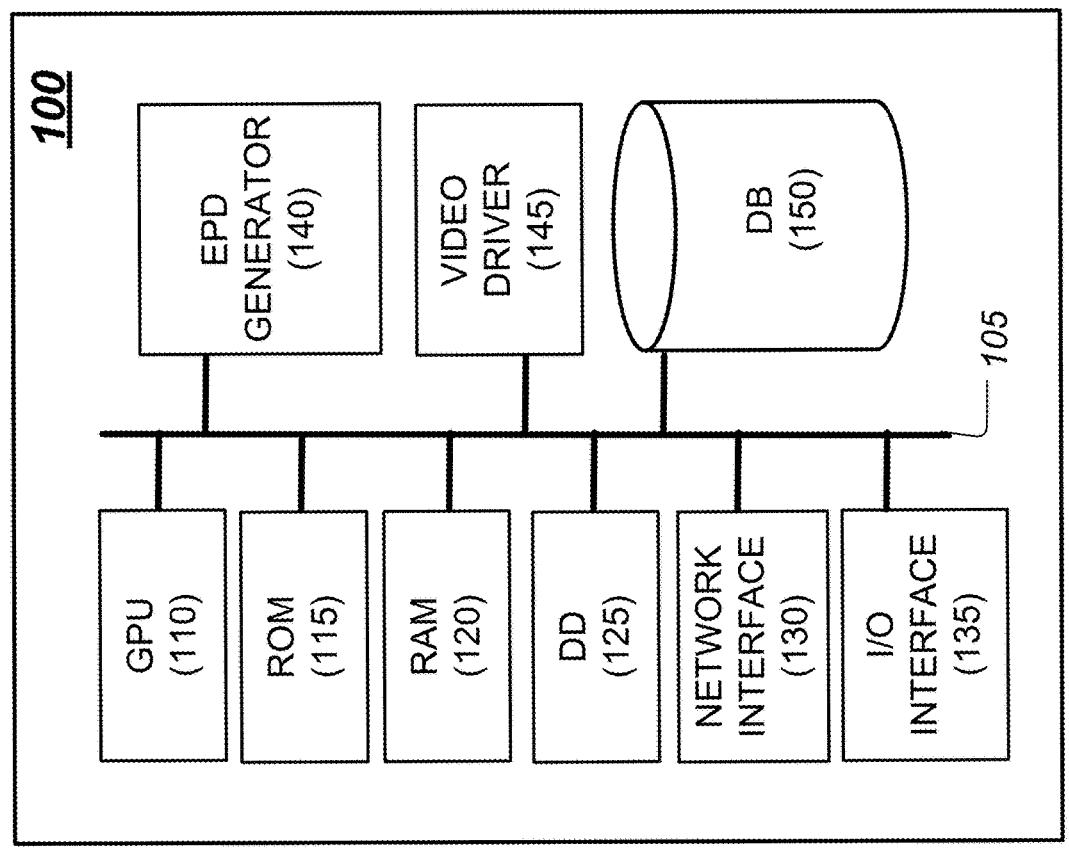
FIG. 4
FIG. 3

ONLINE SYSTEM IDENTIFICATION FOR DATA RELIABILITY ENHANCEMENT

FIELD OF THE DISCLOSURE

The present disclosure relates to a method, a system, an apparatus and a computer program for enhancing data reliability in systems or applications such as, for example, data acquisition or control systems.

BACKGROUND OF THE DISCLOSURE

Control of large or complicated engineered systems such as pipelines, electric power grids, wastewater treatment, transportation or manufacturing is increasingly being accomplished using sophisticated data acquisition or control systems. Such systems can monitor or control processes in real-time. Therefore, timely, accurate and reliable data monitoring and acquisition can be critical to operation of such large or complicated engineered systems.

SUMMARY OF THE DISCLOSURE

According to one non-limiting embodiment of the disclosure, a method is provided for monitoring or controlling a field instrument in a pipeline. The method comprises: receiving a plurality of process readings which originated from a plurality of remote terminal units that are distributed along a portion of the pipeline; analyzing the received plurality of process readings to determine a plurality of influencing process readings and a target process reading; assessing whether the target process reading includes bad data; and generating an estimated process reading or updating a parameter of a system model based on the plurality of influencing process readings and based on whether the target process reading includes bad data.

The method can further comprise switching between a learning mode and an estimation mode based on whether the target process reading includes bad data.

The influencing process readings can originate at a plurality of influencing remote terminal units located upstream or downstream of a target remote terminal unit.

The influencing process readings can originate at a plurality of influencing remote terminal units located upstream and downstream of a target remote terminal unit.

Assessing whether the target process reading includes bad data can comprise determining whether a communication link to the target remote terminal unit is broken or the received target process reading includes a damaged, faulty, or null data packet.

Assessing whether the target process reading includes bad data can comprise determining the target process reading includes good data.

The method can further comprise transmitting the estimated process reading to a human machine interface that renders the plurality of influencing process readings and the estimated process reading on a display device, wherein the target process reading is replaced by the estimated process reading when the target process reading includes bad data.

The method can further comprise correlating the influence process readings with the target process reading to determine correlated influence process readings.

The method can further comprise discarding uncorrelated influence process readings.

The method can further comprise updating the parameter of the system model based on the correlated influence process readings and the target process reading.

The human machine interface can generate a control signal that is transmitted to a field instrument in the pipeline to adjust an attribute in the pipeline.

According to another non-limiting embodiment of the disclosure, a system is provided for monitoring or controlling a plurality of field instruments in a pipeline. The system comprises: an online system identification server that receives a plurality of process readings that originated from a plurality of remote terminal units distributed along a portion of the pipeline and transmits an estimated process reading to a human machine interface. The online system identification server can analyze the received plurality of process readings to determine a plurality of influencing process readings and a target process reading, assess whether the target process reading includes bad data, and generate an estimated process reading or updates a parameter of a system model based on whether the target process reading includes bad data. The online system identification server can switch between a learning mode and an estimation mode based whether the target process reading includes bad data. The influencing process readings can originate at a plurality of influencing remote terminal units located upstream or downstream of a target remote terminal unit.

The target process reading can be assessed to include bad data when the target process reading includes a damaged, faulty, or null data packet.

The online system identification server can correlate the influence process readings with the target process reading to determine correlated influence process readings.

The online system identification server can comprise: a correlation analyzer that correlates the influence process readings to the target process reading; and a system modeler that updates the parameter of the system model in the learning mode and stops updating the parameter in the system model in the estimation mode.

According to another non-limiting embodiment of the disclosure, a non-transitory computer readable storage medium storing monitoring or controlling program instructions is provided for causing a field instrument in a pipeline to be monitored or controlled. The computer program instructions comprise the steps of: receiving a plurality of process readings that originated from a plurality of remote terminal units that are distributed along a portion of the pipeline; analyzing the received plurality of process readings to determine a plurality of influencing process readings and a target process reading; assessing whether the target process reading includes bad data; and generating an estimated process reading or updating a parameter of a system model based on the plurality of influencing process readings and based on whether the target process reading includes bad data.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure.

No attempt is made to show structural details of the disclosure in more detail than may be necessary for a fundamental understanding of the disclosure and the various ways in which it may be practiced.

FIG. 3 shows an example of an OSI processor that can be included in the MAC station in FIG. 2.

FIG. 4 shows an example of an estimation process data (EPD) generator that can be included in the OSI processor in FIG. 3.

Figure 1:
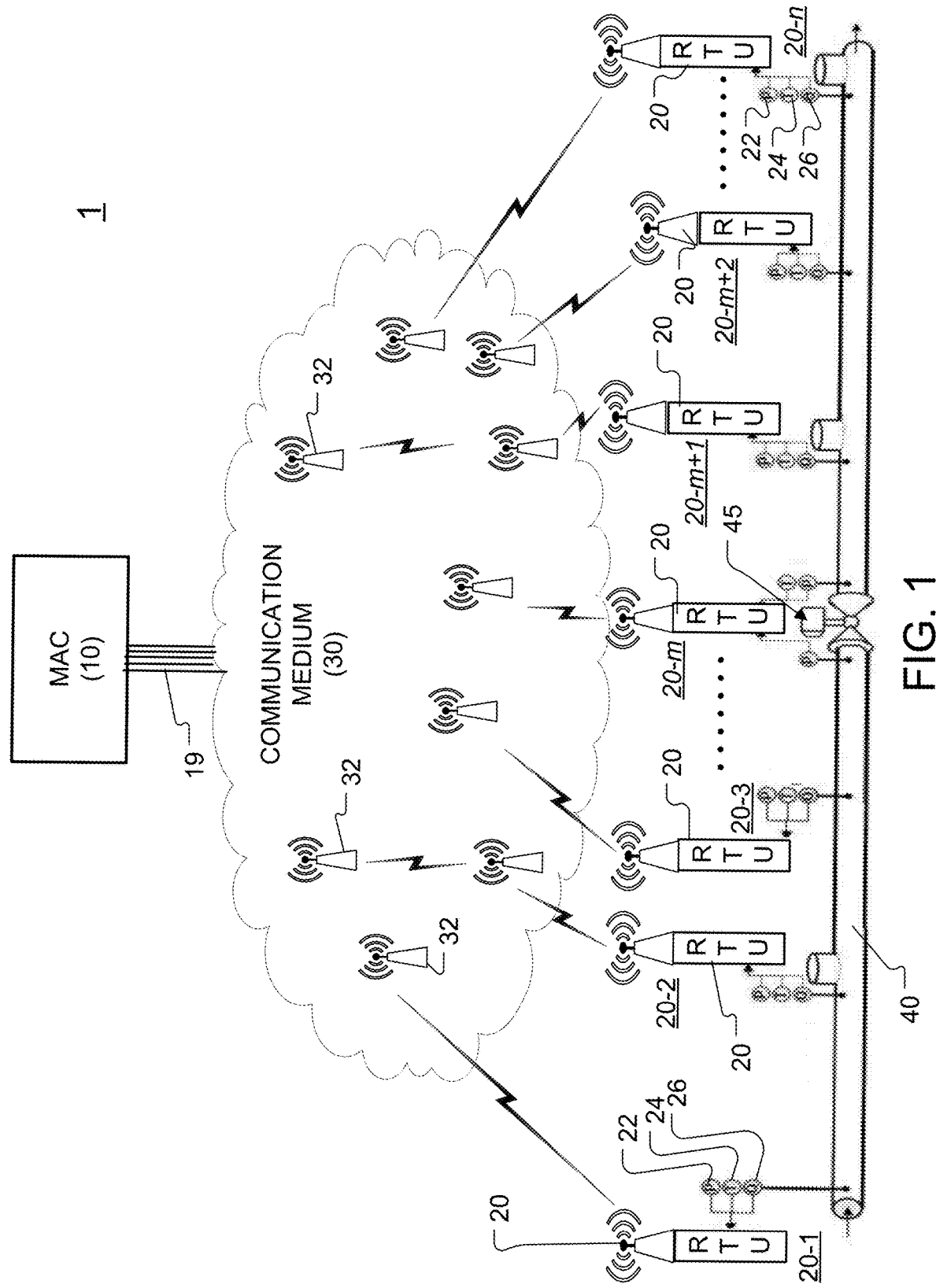
FIG. 1 shows an example of a control system, constructed according to the principles of the disclosure.

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment may be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure may be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

According to the principles of the disclosure, an online system identification solution can be incorporated in an application, such as, for example, for development of a system model, an adaptive system control, a failure detection system, or for building a mathematical model of a dynamical system from measured attribute data. According to a non-limiting embodiment of the online system identification solution, an online system identifier (OSI) can be incorporated in a data acquisition or control system, such as, for example, a supervisory control and data acquisition (SCADA) system or a distributed control system (DCS) to enhance the reliability of system data. For instance, in a SCADA system example, a real-time SCADA server can receive or collect process data (directly or via an intermediary communicating device such as a terminal server) from one or more nodes that can be scattered across a large geographic area. The process data can include readings from field instruments, such as, for example, pressure readings, temperature readings, fluid flow rate readings, or fluid velocity readings. The OSI can receive process data and associated quality flags from the real-time SCADA server and construct a system model, such as, for example, a heuristic system model, that defines the input-output relationships between correlated data sources at the nodes. Each node can include a data source such as, for example, one or more field instruments that can measure or monitor one or more attributes at or near the node to provide process data to the real-time SCADA server (or DCS system). The OSI can receive process data from less than all data sources in the system and provide estimated process data for the remaining data sources. For instance, the OSI can receive attribute data that includes measurement readings from less than all field instruments (for example, attribute sensors 22, 24, of 26, shown in FIG. 1) and generate accurate estimated attribute data that includes representative estimated measurement readings for the remaining field instruments in the system. The estimated attribute data can be used by, for example, the SCADA/DCS systems to measure, monitor, manage, adjust, or control one or more attributes in the system.

The OSI can receive process data from the nodes and generate estimated process data where process data is determined to be missing, lost, or to contain bad data. Process data can include attribute data that is received from field instruments that are located at the nodes. Process data for a given node can be missing, lost, or contain bad data due to factors, such as, for example, the node being offline or not operating properly, or where a connectivity link to the node is broken, or where the process data becomes corrupted as a result of an error, noise, or other influence on the process data introduced by or along a transmission pathway. The estimated process data can be used by the SCADA system or DCS system in lieu of missing, lost or bad process data. The estimated process data can be transmitted to a human machine interface (HMI) in the SCADA/DCS system to provide backup readings whenever the primary data source at a node fails or the process data is lost, or to adjust or control one or more attributes in the system by means of, for example, one or more field instruments located in the system. As a result, an HMI can receive, render or utilize good process data from nodes that are properly operating or estimated process data from the OSI for those nodes that are not properly operating or from which process data is not received or includes bad data.

FIG. 1 shows a non-limiting embodiment of a control system 1 constructed according to the principles of the disclosure. The control system 1 includes a monitoring and control (MAC) station 10, a plurality of nodes 20-1 to 20-*n* (where n is a positive integer greater than 1), communication medium 30, and a structure of interest 40. The MAC station 10 can include the architecture shown in FIG. 2. The MAC station 10 can include a localized system within a defined footprint or a distributed system having components located at various geographic locations that can be connected by a backbone 11 and communication links. The MAC station 10 can include a process automation network (PAN). According to a non-limiting example, the control system 1 can include, for example, hundreds or more remote terminal units (RTUs) and thousands or more field instruments (such as, for example, attribute sensors 22, 24, 26).

Figure 2:
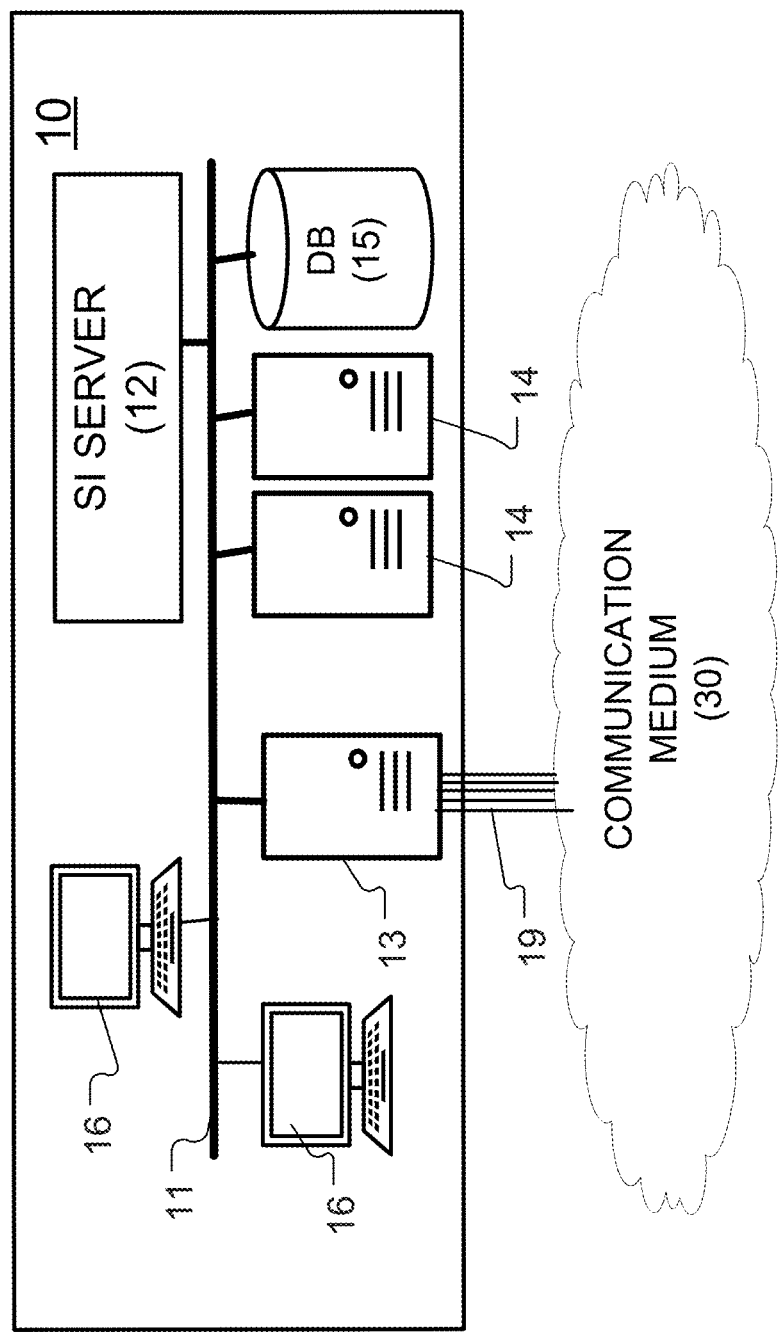
FIG. 2 shows an example of a MAC station that can be included in the control system in FIG. 1.

FIG. 2 shows a non-limiting embodiment of an architecture for the MAC station 10, according to the principles of the disclosure. The MAC station 10 can include an online system identifier (OSI) server 12. The MAC station 10 can include a terminal server 13, a system server 14, a database 15, and a human-machine interfaces (HMI) 16. The MAC station 10 can include a backbone 11 that interconnects the various components in the MAC system 10, each of which can be connected to the backbone 11 via a communication link.

The backbone 11 can transmit data packets at the transport layer of the Open System Interconnection (OSI) model. The data packets can be configured according to a communication protocol such as Transmission Control Protocol (TCP), User Datagram Protocol (UDP), Datagram Congestion Control Protocol (DCCP), Stream Control Transmission Protocol (SCTP), Resource Reservation Protocol (RSVP), or any other communication protocol that can be implemented in the MAC station 10 without departing from the scope or spirit of the disclosure. The data packets can include an Internet Protocol (IP) such as, for example, IPv4 or IPv6.

The OSI server 12 can include an OSI processor 100, of which a non-limiting embodiment is shown in FIG. 3. The OSI server 12 (or, more specifically, the OSI processor 100) can analyze process data received from the nodes 20-1 to 20-n in the control system 1 and generate a system model, such as, for example, a heuristic system model, that defines an input-output relationship of the nodes 20-1 to 20-n in the structure of interest 40, including, the data source(s) (for example, attribute sensors 22, 24, or 26) at each node. For a given arbitrary node 20-m, the OSI server 12 can receive process data from a subset of the nodes, such as, for example, nodes 20-1 to 20-m−1 and 20-m+1 to 20-n and provide estimated process data for the remaining node 20-m, where m is a positive integer less than n. The process data of the mentioned subset (nodes 20-1 to 20-m−1 and 20-m+1 to 20-n) is declared to have good quality (shown at 310 in FIG. 6B) and correlated to the process data of node 20-m (shown at 330 in FIG. 6B). The estimated process data can be utilized by the MAC station 10 whenever the process data is not received from one or more nodes 20-1 to 20-n (for example, node 20-m) or the received process data includes bad data (for example, lost or corrupted data packets). The OSI server 12 can carry out an estimated process data (EPD) generating process 200 (shown in FIG. 5) or 300 (shown in FIG. 6A or 6B), discussed below.

The terminal server 13 can be communicatively coupled to each of the nodes 20-1 to 20-n via a unique or a shared communication link and the communication medium 30. The terminal server 13 can include a firewall (not shown). The terminal server 13 can be coupled to the communication medium 30 via communication links 19, each of which can transmit data between one of the nodes 20-1 to 20-n and the terminal sever 13 over a separate communication link, which can include a serial line. The terminal server 13 can be configured to receive process data in real-time from each of the nodes 20-1 to 20-n and transmit the received real-time process data to the system server 14 or database 15 via, for example, the backbone 11. The terminal server 13 can be connected to the backbone 11, system server 14, or database 15 via one or more communication links.

The system server 14 can include a real-time SCADA server or SCADA master terminal unit (not shown) that receives and gathers field instrument readings originating from the nodes 20-1 to 20-n, stores the received field instrument readings as process data, and hosts services for the HMI 16, including rendering the process data for display on a display device in the HMI 16. The system server 14 can scan the process data received from the nodes 20-1 to 20-n, which can include field instrument readings transmitted by the RTU 20 at each node. The system server 14 can process, generate, or schedule alarms, events, or control commands. The system server 14 can transmit process data to the HMI 16 or receive data signals or control signals from the HMI 16, which can be destined to a particular one or more nodes in the structure of interest 40 to control a field instrument or function performed by the field instrument.

The system server 14 can provide a control signal, such as, for example, a feedback control signal, to one or more of the nodes 20-1 to 20-n. The control signal(s) can be applied to one or more field instruments to control one or more attributes in the structure of interest 40. The system server 14 can include both a database server (not shown) and an application server (not shown). The application server (not shown) can provide human-machine interaction services to the HMI 16, such as, for example, data monitoring and control. The database server (not shown) can include the database 15, or the database 15 can include the database server (not shown). The system server 14 can provide access control management to, for example, serialize access to shared computing resources by multiple computing or communicating devices such as, for example, the HMI 16. The system server 14 can transmit real-time process data (for example, a real-time field instrument reading data) for each field instrument (for example, attribute sensors 22, 24, or 26) in the control system 1 to the HMI 16. The system server 14 can transmit estimated process data substantially in real-time (for example, estimated data reading) that the system server 14 received from the OSI server 12 for each field instrument for which bad or lost data readings were determined.

The database 15 can include a relational database. The database 15 can include a database management system (DBMS) such as, for example, SQL, MySQL, Oracle, Access, or Unix. The database 15 can store process data (including, for example, real-time field instrument readings) and support a variety of queries in the MAC station 10, or queries received from outside of the MAC station 10.

The HMI 16 can include a computing device or communicating device. The HMI 16 can include a display device that can render process data, as seen, for example, in the display screen 400 (shown in FIG. 7), 500 (shown in FIG. 9) or 600 (shown in FIG. 10).

As seen in FIG. 1, the communication medium 30 can include a plurality of access points (AP) 32. The communication medium 30 can include a network. The APs 32 can be configured to form a network. The network can include one or more routers (not shown), switches (not shown), hubs (not shown), servers (not shown), computing devices (not shown), communicating devices (not shown), transmission media (not shown), or subnetworks. The AP 32 can include a wireless access point (WAP), a wired access point, a cell site, a cell tower, a cellular base station, a satellite dish, a satellite transceiver, or any other communicating device that can transmit signals between the MAC station 10 and one or more nodes 20-1 to 20-n. Each AP 32 can connect to a unique node, or the AP 32 can connect to more than one node. In the latter instance, the AP 32 can connect to multiple nodes using, for example, frequency division multiplexing (FDM) or time division multiplexing (TDM) methodologies.

The nodes 20-1 to 20-n can each include an RTU 20. The RTU 20 can include a programmable logic controller (PLC) such as, for example, a micro-processor, single-board computer, or a programmable application specific integrated circuit (ASIC). The RTU 20 can include a transceiver that transmits field instrument reading data (for example, measurement signals) between the associated node and the terminal server 13 (shown in FIG. 2) in the MAC station 10. Each node 20-1 to 20-n can include one or more attribute sensors to measure or monitor a respective attribute at the node in the structure of interest 40. For instance, the node 20-1 can include a first attribute sensor 22, a second attribute sensor 24, and a third attribute sensor 26. The nodes 20-1 to 20-n can include additional (or fewer) than three attribute sensors. The attribute sensors 22, 24, 26 can sense, measure or monitor attributes in (or on or at) the structure of interest 40 at the associated node and transmit attribute data for the sensed/measured/monitored attribute to the RTU 20, which in turn can transmit the attribute data as field instrument reading data to the MAC 10. The attribute sensors 22, 24, 26 can be coupled to the RTU 20 via one or more communication links. The RTU 20 can be integrated with field instruments such as the attribute sensors 22, 24, 26 into a single device (not shown), or the RTU 20 and field instruments (for example, attribute sensors 22, 24, 26) can be provided as separate devices (as shown in FIG. 1).

According to a non-limiting embodiment, the first attribute sensor 22 can include a pressure sensor that detects, measures or monitors pressure P (the first attribute) in the structure of interest 40 at the location of the attribute sensor 22. The second attribute sensor 24 can include a temperature sensor that detects, measures or monitors temperature T (the second attribute) in the structure of interest 40 at the location of the attribute sensor 24, which can be collocated with the attribute sensor 22 or located at a different location. The third attribute sensor 26 can include a fluid velocity sensor that measures or monitors the velocity of flowing fluid V (the third attribute) in the structure of interest 40 at the location of the third attribute sensor 26, which can be collocated with the attribute sensors 22 or 24, or located at different locations than the location of the attribute sensors 22 or 24. The nodes can include more (or fewer) than three attribute sensors, which can measure or monitor attributes such as, for example, current, force, acceleration, tilt, acidity, alkalinity, or any other attribute that is to be monitored or controlled in the structure of interest 40.

Any one or more of the nodes 20-1 to 20-n can include a field instrument such as, for example, a mechanical device that can be operated, driven, controlled or adjusted to manage, control, or modify an attribute in the structure of interest 40. For example, in a pipeline application the field instrument can include a valve (not shown), a pump (not shown) or any other device (not shown) that can be operated or controlled to adjust one or more attributes of the pipeline or the fluid in the pipeline, such as, for example, pressure P, temperature T, fluid velocity V, or fluid flow rate. In an example having a valve (not shown), the valve can include an electrical valve that is driven by an electrical signal from a relay (not shown), a potentiometer (not shown), or a switch (not shown) to open or close to control an attribute of the fluid, such as, for example, pressure, temperature, velocity or flow rate, including stopping, starting, reducing, or increasing fluid flow in the structure of interest 40.

The structure of interest 40 can include, for example, a pipeline (for example, an oil pipeline, a gas pipeline, a water pipeline, a wastewater pipeline), a plant (for example, a wastewater treatment plant, a water purification plant, and industrial plant, a manufacturing plant, or an electric power plant), an electric power grid, solar panel farm, wind-turbine farm, a vehicle (for example, automobile, truck, bus, boat, ship, or airplane), a building HVAC (heating, ventilation and air conditioning) system, a building electrical system, or any other structure that has one or more attributes that can be measured, monitored or controlled.

In the non-limiting example shown in FIG. 1, the structure of interest 40 includes a gas/oil pipeline. In this example, the control system 1 can include a measurement station 45. The measurement station 45 can include an attribute sensor 22 that detects, measures or monitors pressure of a fluid flowing in the pipeline at the node 20-m. The attribute sensor 22 can output attribute data that includes pressure reading data to the local RTU 20 at the node 20-m. Similarly, the attribute sensors 24 or 26 can output temperature reading data or flow rate reading data to the RTU 20 at the node 20-m. The RTU 20 in turn can transmit the attribute data (for example, flow rate, pressure or temperature data) as process data to the MAC station 10.

FIG. 3 shows a non-limiting embodiment of an OSI processor 100, according to the principles of the disclosure. The OSI processor 100 can include a graphic processor unit (GPU) 110, a read-only memory (ROM) 115, a random-access memory (RAM) 120, a disk drive (DD) 125, a network interface 130, or an input-output (I/O) interface 135. The OSI processing unit includes an estimated process data (EPD) generator 140. The OSI processor 100 can include a video driver 145 or a database 150. The OSI processor 100 can include a bus 105. The components in the OSI processor 100 can be connected to the bus 105 via a communication link. The bus 105 can be any of several types of bus structures that can further interconnect to a memory bus (with or without a memory controller), a peripheral bus, and a local bus using any of a variety of commercially available bus architectures.

The GPU 110 can be any of various commercially available processors. Dual microprocessors and other multi-processor architectures can also be employed as the GPU 110. The GPU 110 can be a central processing unit (CPU).

The OSI processor 100 includes a computer-readable medium that can hold executable or interpretable computer code (or instructions) that, when executed by the GPU 110, cause the steps, processes and methods described in this disclosure to be carried out. The computer-readable medium can be provided in the ROM 115, RAM 120, DD 125, DB 150, or an external computer-readable medium connected to the OSI processor 100 via the network interface 130 or the I/O interface 135. The computer readable medium can include sections of computer code that, when executed by the GPU 110 (or the PD generator 140) cause the EPD generating process 200 (shown in FIG. 5) or 300 (shown in FIG. 6A) to be carried out, and all other process steps described or contemplated in the specification.

A basic input/output system (BIOS) can be stored in a non-volatile memory in the OSI processor 100, such as, for example, the ROM 115. The ROM 115 can include a ROM, an erasable programmable read-only memory (EPROM), or an electrically erasable programmable read-only memory (EEPROM). The BIOS can contain the basic routines that help to transfer information between components within the OSI processor 100, such as during start-up. The RAM 120 can include a high-speed RAM such as static RAM for caching data.

The disk drive (DD) 125 can include a hard drive, such as, for example, an enhanced integrated drive electronics (EIDE) drive, or a serial advanced technology attachments (SATA) drive. The DD 125 can include an optical disk drive that can read/write from/to a compact disk read-only memory (CD-ROM) disk (not shown), or, read from or write to other high capacity optical media such as a digital video disk (DVD). The DD 125 can be configured for external use in a suitable chassis (not shown). The DD 125 can be connected to the bus 105 by a hard disk drive interface (not shown) and an optical drive interface (not shown), respectively. The hard disk drive interface (not shown) can include a Universal Serial Bus (USB) (not shown) or an IEEE 1394 interface (not shown) for external applications.

The DD 125 and associated computer-readable media can provide nonvolatile storage of data, data structures, or computer-executable instructions. The DD 125 can accommodate the storage of any data in a suitable digital format. The DD 125 can include one or more apps that are used to execute aspects of the architecture described in this specification.

A number of program modules can be stored in the DD 125, ROM 115, or RAM 120, including an operating system (not shown), one or more application programs (not shown), other program modules (not shown), and program data (not shown). Any (or all) of the operating system, application programs, program modules, and program data can be cached in the RAM 120 as executable sections of computer code.

The network interface 130 can be connected to the backbone 11 (shown in FIG. 2). The network interface 130 can include a wired or a wireless communication network interface (not shown) or a modem (not shown). When used in a local area network (LAN), the OSI processor 100 can be connected to the LAN network through the wired or wireless communication network interface; and, when used in a wide area network (WAN), the OSI processor 100 can be connected to the WAN network through the modem. The modem (not shown) can be internal or external and wired or wireless. The modem can be connected to the bus 105 via, for example, a serial port interface (not shown).

The I/O interface 135 can receive commands and data from, for example, an operator via a user interface device (not shown), such as, for example, a keyboard (not shown), a mouse (not shown), a pointer (not shown), a microphone (not shown), a speaker (not shown), or a display (not shown). The received commands and data can be forward to the GPU 110 from the I/O interface 135 as instruction and data signals via the bus 105.

The EPD generator 140 can include one or more computing devices or modules. The EPD generator 140 can include a neural network, a deep neural network, a linear time-invariant (LTI) filter (for example, a Wiener Filter), a linear quadratic estimate (LQE) filter (for example, a Kalman Filter), or any other technological solution that can be implemented for systems identification modeling according to the principles of the disclosure. The EPD generator 140 can receive a data stream that includes process data from the system server 14 along with data quality flags. The system server 14 can analyze the process data received from the nodes 20-1 to 20-$n$ to determine the quality of the process data (for example, bad data, lost data, missing data, or good data) and generate or mark associated quality flags. The EPD generator 140 can perform systems identification and generate estimated process data to replace process data that has been marked as bad or lost by the system server 14. The estimated process data can be transmitted to the system server 14 so that the system server 14 can provide process data for all nodes 20-1 to 20-$n$ in the control system 1, including actual real-time field instrument readings that were received from the nodes and estimated target process readings for those nodes from which process data was not received or for which the received process data was determined to include bad data. The EPD generator 140 alone or with the GPU 110 can carry out the EPD generating process 200 (shown in FIG. 5) or 300 (shown in FIG. 6A).

The video driver 145 can include a graphics driver (not shown), a video adaptor (not shown), or any other device necessary to render an image signal on a display device, such as, for example, in the HMI 16 (shown in FIG. 2).

FIG. 4 shows a non-limiting example of an EPD generator 140. The EPD generator 140 can include a data quality analyzer 142, a correlation analyzer 144, a system modeler 146, and an error detector 148. The EPD generator 140 can include an input/output (I/O) interface 149. The data quality analyzer 142, correlation analyzer 144, system modeler 146, error detector 148, or I/O interface can each include a computing device or module, or they can be integrated into or made as a single computing device or module.

The data quality analyzer 142 can parse or analyze process data (X, Y) and associated quality data (x, y) received from the system server 14 and determine whether the received data includes good data or bad data. Bad data can include lost, missing, corrupted or damaged data or data packets.

The correlation analyzer 144 can analyze the process data (X, Y) originating from nodes 20-1 to 20-$n$ and identify process data (X) that can be correlated with process data (Y). The correlation analyzer 144 can work with the system modeler 146, which can include black-box identification, grey-box identification, white-box identification or another system identification solution that can be used with the control system 1 or structure of interest 40 (shown in FIG. 1). In grey-box identification, although the attributes in the structure of interest 40 or control system 1 might not be known, a system model can be constructed based on insight into or experimental data for the control system 1 and structure of interest 40, which can be utilized in determining relationships between data sources (for example, attribute sensors 22, 24, 26) at the nodes 20-1 to 20-$n$, or the process data (X) received from the nodes. The correlation analyzer 144 can utilize the system model to identify process data that includes influencing field instrument reading (X) that can be correlated with target process data (Y).

Figure 8A:
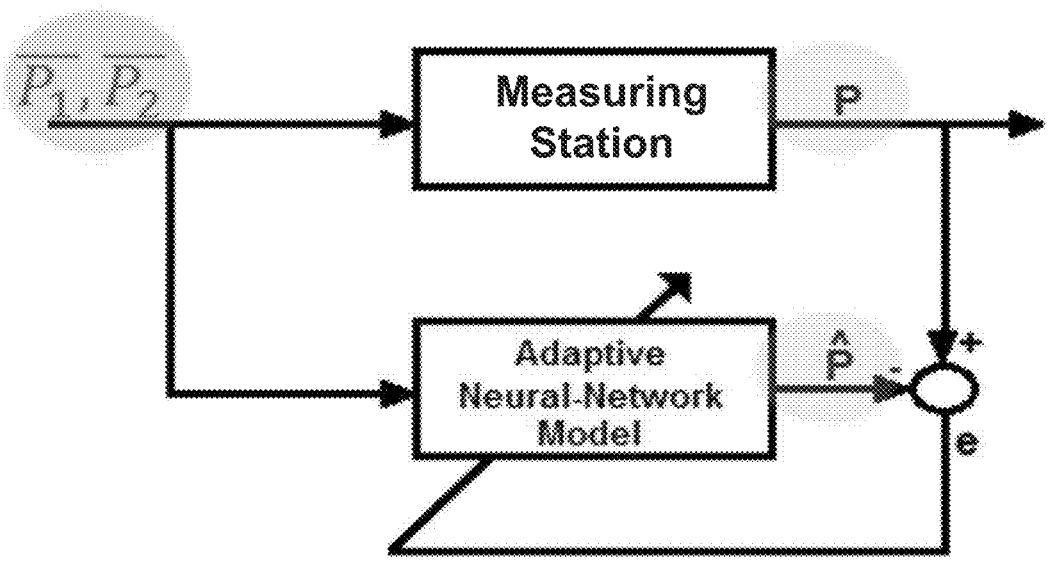
FIGS. 8A and 8B show an example of using a Steepest Decent Algorithm in the control system shown in FIG. 1 to minimize a Least Mean Square function by updating model parameters in an example of an adaptive neural network.
Figure 8B:
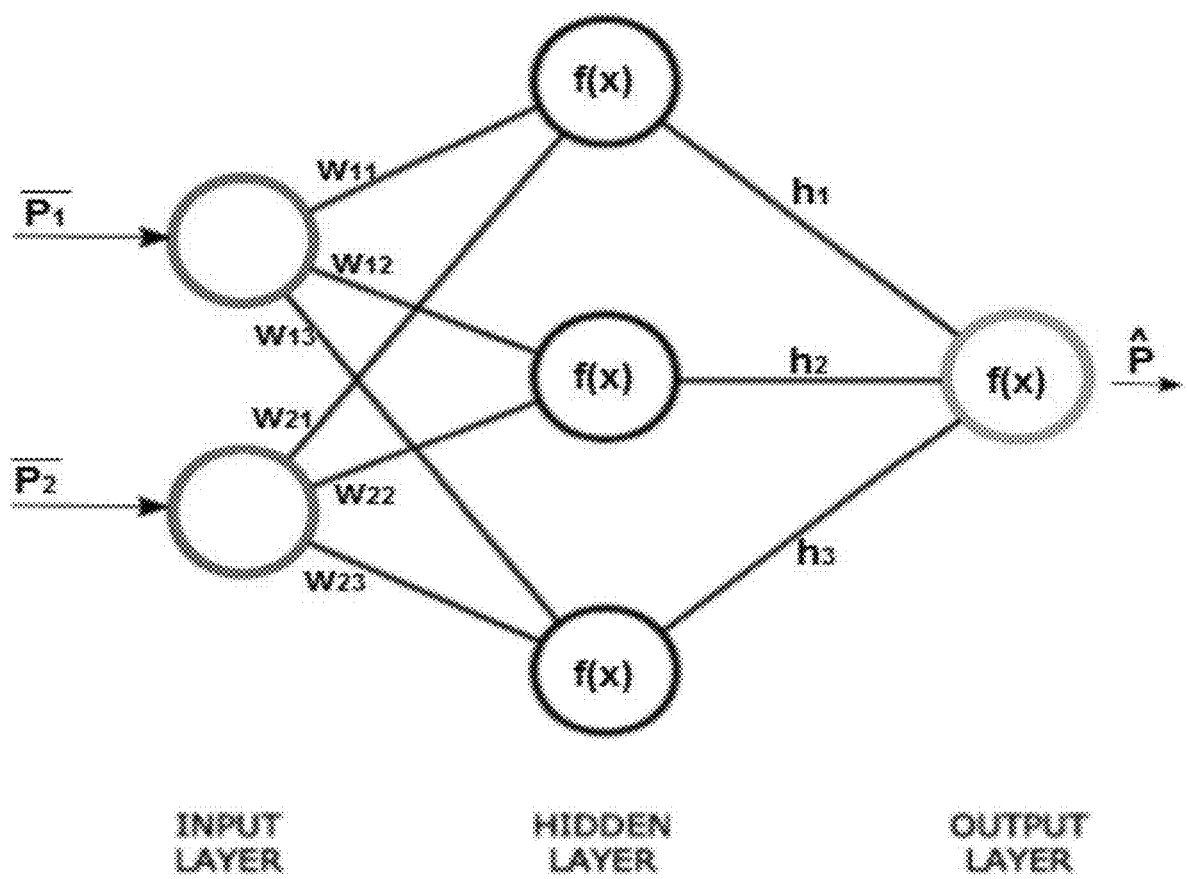

The system modeler 146 can include a linear or non-linear systems identification model. The systems modeler 146 can include a neural network (NN), a deep neural network (DNN), a Wiener Filter, a Kalman Filter, or any machine learning system or network of systems that can perform systems identification modeling based on the attribute data received from the nodes 20-1 to 20-$n$. The system modeler 146 can, for example, execute a Steepest Decent Algorithm on the process data (X, Y) to provide gradual adjustments of system model parameters such that, for example, a predefined Cost Function, J, is minimized. FIGS. 8A and 8B show diagram of an example of using a Steepest Decent Algorithm to minimize an LMS function by updating model parameters in, for example, an adaptive neural network model. The Cost Function, J, can include for example, a Least Mean Square (LMS), as defined by the equation $$J = 0.5 \Sigma (Y - \hat{Y})^2$$

where J is the Cost Function, Y is a target data point for a node (for example, node 20-$m$, discussed below), and Ŷ is the estimated process data for the target point Y. The Cost Function can include a normalized LMS (nLMS) or another cost function that might be available and suitable for systems identification. The Steepest Decent Algorithm can be used to minimize the Cost Function by, for example, updating neural network model parameters.

The error detector 148 can receive target process data (Y) and estimated process data (Ŷ) and, based on the received process data (Y, Ŷ), the error detector 148 can generate an error signal. FIG. 8A depicts a block diagram of an implementation of the error detector 148 to control one or more model parameters in an adaptive neural-network model. The error signal can be sent to, for example, the system modeler 146 to identify or update one or more parameters in the system model. On the basis of the error signal, the system modeler 146 can update the parameters (for example, in the learning mode) or stop updating the parameters and generate estimated parameter data (Ŷ) (for example, in the estimation mode) based on good quality process data (X) that are input to the model.

The I/O interface 149 can receive or transmit commands or data between any one or more of the components in the EPD generator 140 and a communicating device or computing device external to the EPD generator 140, such as, for example, the GPU 110, ROM 115, RAM 120, DD 125, or DB 150 in the OSI processor 100, or external to the OSI processor 100, such as, for example, the system server 14.

Figure 5:
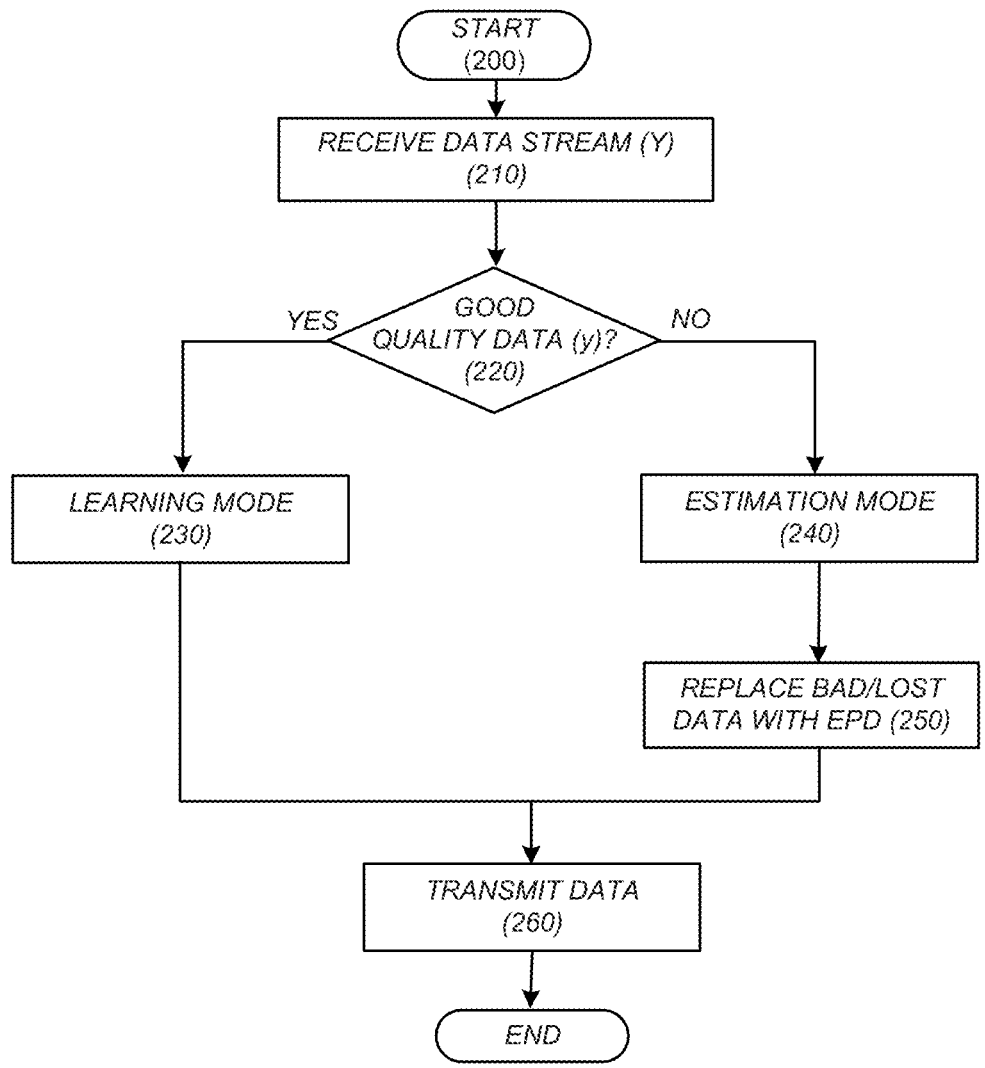
FIG. 5 shows an example of an EPD generation process, according to the principles of the disclosure.

FIG. 5 shows a non-limiting example of an EPD generating process 200, according to the principles of the disclosure. As noted earlier, the EPD generating process 200 can be carried out by the SI server 12 (shown in FIG. 2) or the OSI processor 100 (shown in FIG. 3).

Referring to FIG. 5, the OSI processor 100 (shown in FIG. 3) in the SI server 12 (shown in FIG. 2) can initially receive one or more data streams (Y) from the system server 14 (Step 210). The quality flag of target data (Y) can determine whether to continue in learning mode for that data instance or switch to estimation mode. In a non-limiting embodiment of the disclosure, the system server 14 is a real-time SCADA server and the OSI processor 100 receives a data stream from the system server 14 that includes real-time SCADA data readings as process data (Y) and the associated quality flags (y) for the process data (Y) as determined by the real-time SCADA server 14. In this example, the process data (X) includes attribute data (for example, pressure reading data P, temperature reading data T, or flow rate reading data V) received from the nodes 20-1 to 20-$m$−1 and 20-$m$+1 to 20-$n$. In this example, process data (Y) for node 20-$m$ is not received or the received process data (Y) contains bad quality data (y) that renders the process data (Y) unusable. The real-time SCADA server 14 can determine a quality flag (y) for the process data (Y) for the node 20-$m$ that indicates the process data (Y) includes good data or bad data. Similarly, the real-time SCADA server 14 can determine a quality flag (x) for the process data (X) for the nodes 20-1 to 20-$m$−1 and 20-$m$+1 to 20-$n$ that indicate the process data (X) includes good data or bad data and hence determine their usability in further processing.

The OSI processor 100 (shown in FIG. 3) can evaluate the received process data (X, Y) and associated quality flags (x, y) and determine whether the received data is good (YES at Step 220) based on quality flag (y). Thus, the OSI processor 100 may enter a learning mode and use the good process data (X) as training data for machine learning to build or update the system model (Step 230). However, if, based on the process data (Y) and associated quality flag (y), the OSI processor 100 determines the process data (Y) includes bad data (NO at Step 220), then the OSI processor 100 may enter an estimation mode (Step 240) where it may stop updating or building the system model and, instead, generate estimation process data (Ŷ) based on the good process data (X) to replace the bad process data (Y) (Step 250). The estimated process data (Ŷ) can be transmitted substantially in real-time to the system server 14 (Step 260) to replace the bad process data (Y) with the estimated process data (Ŷ). The system server 14 uses the good process data (X) that may be buffered in the system server 14 while the OSI server 12 (shown in FIG. 2) provides replacement estimate process data (Ŷ).

According to a non-limiting embodiment, a modeling instance can be running for each and every data reading. The data reading can play the role of target variable (Y) when it is being modeled, or it can play the role of influencing variable (X) when it is used as input for other data readings' models. In a case where the data reading is a target variable (Y), then its quality flag can determine whether the SI server 12 continues in learning mode or switches to estimation mode for the data reading (Y). In a case where the data reading is an influencing variable (X), then its quality flag can determine whether the SI server 12 uses it as an input to the models of the other correlated data readings or just discards it.

In a non-limiting example, 38 pressure data readings can be received by the SI server 12. Thus, 38 models can be created (an estimate Ŷ per data reading Y). The 38 data readings themselves can also be used as inputs (X) for each other's models. So, each of the 38 data readings can be a target variable (for example, one time) and influencing variable (for example, many times) to others' models.

The system server 14 can transmit the good process data (X) and estimated process data (Ŷ) to the HMI 16. The system server 14 can receive control signals from the HMI 16 and transmit the control signals to one or more of the nodes 20-1 to 20-$n$. The HMI 16 can be operated to monitor or control a supervisory control or data acquisition system component such as a field instrument in the structure of interest 40 (shown in FIG. 1). A control signal can be generated by the HMI 16 and transmitted to the system server 14, which in turn can transmit a feedback control signal to the one or more nodes 20-1 to 20-$n$ to control the field instrument (for example, attribute sensor 22, 24, or 26) to, for example, adjust, modify or set a particular attribute (for example, pressure, velocity, or flow rate) in the structure of interest 40.

Figure 6A:
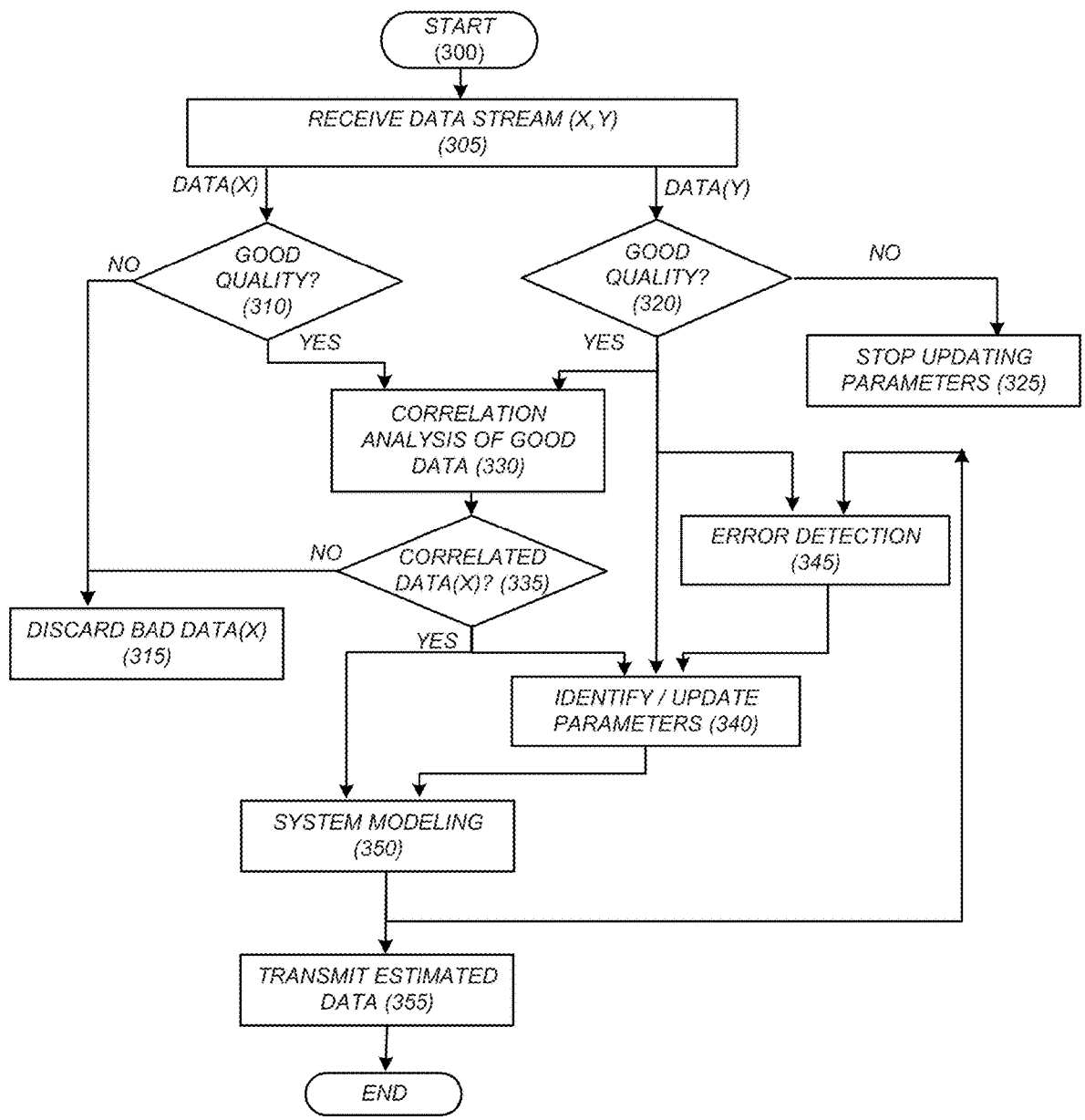
FIG. 6A shows another example of an EPD generation process, according to the principles of the disclosure.

FIG. 6A shows another non-limiting example of an EPD generating process 300, according to the principles of the disclosure. As noted earlier, the EPD generating process 300 can be carried out by the OSI processor 100 (shown in FIG. 3) or the EPD generator 140 (shown in FIGS. 3 and 4), which can be included in the OSI server 12 (shown in FIG. 2).

Referring to FIG. 6A, with additional references to FIGS. 1 and 4, the EPD generator 140 (shown in FIG. 4) can initially receive one or more data streams from the system server 14 via, for example, the I/O interface 149 (Step 305). As previously noted, the system server 14 (shown in FIG. 2) in this non-limiting embodiment includes a real-time SCADA server. The EPD generator 140 can receive a data stream from the system server 14 that includes process data (X) that originated from nodes 20-1 to 20-$m$−1 and 20-$m$+1 to 20-$n$ (shown in FIG. 1) and associated quality flags (x), as well as target process data (Y) that originated from node 20-*m* and associated quality flags (y). The received process data (X) can include field instrument readings from the field instruments distributed along a portion of the structure of interest 40 at the nodes 20-1 to **20-*m*−1 and 20-*m*+1 to 20-*n*. The associated quality flags (y) can indicate the target process data (Y) includes good data or bad data. The target process data (Y) can include field instrument readings from the field instrument(s) located at the node 20-*m*. As noted above, bad data can include missing, lost, corrupted or damaged data or data packets. The quality flags (x, y) can be determined by the system server 14 (shown in FIG. 2) by analyzing the process data (X, Y) received from the nodes 20-1 to 20-*n*** to provide quality flags (x, y) that indicate whether the process data (X, Y) includes good or bad data.

The process data (X) can include attribute data received from the RTUs 20 at the nodes 20-1 to **20-*m*−1 that are upstream of the node 20-*m* and nodes 20-*m*+1 to 20-*n* that are downstream of the node 20-*m* (shown in FIG. 1). In this example, the process data (Y) can include attribute data from the RTU 20 at node 20-*m*, or where the attribute data is bad, the process data (Y) can include null data or no data. The target process data (Y) may include bad data or may not include any data. Bad data can include, for example, one or more missing data packets. In this non-limiting example, the node 20-*m* is a target data point (Y) for which estimated process data ($\hat{Y}$) needs to be generated and the process data (X) is influencing field instrument readings data from upstream and downstream nodes 20-1 to 20-*m*−1 and 20-*m*+1 to 20-*n* that can be used by the EPD generator 140 to generate the estimated process data ($\hat{Y}$). The target process data (Y) from the node 20-*m* can be analyzed by the system server 14 and the quality flag (y) generated based on the results of the analysis. For instance, if no process data (Y) is received from the node 20-*m* despite repeated pinging of the RTU 20 by the terminal server 13 (or system server 14), or the communication link between the node 20-*m* and the terminal server 13 is determined to be broken, or the process data (Y) is determined to be missing necessary data packets, or the process data (Y) has been corrupted during transmission, then the system server 14 (shown in FIG. 1**) can generate a quality flag (y) that indicates the process data (Y) includes bad data.

The process data (X) and associated quality flag (x) can be parsed from the received data stream and analyzed by the data quality analyzer 142 (shown in FIG. 4) to determine whether the process data (X) includes good data or bad data (Step 310). The quality flag of influencing data set (X) can determine whether to use the associated data instances in further steps or discard them. If the quality analyzer 142 determines that the process data (X) includes bad data (NO at Step 310), then the bad process data (X) can be discarded (Step 315). If, however, it is determined that the process data (X) includes good data (YES at Step 310), then the good process data (X) can be forwarded by the quality analyzer 142 to the correlation analyzer 144 (shown in FIG. 4) for correlation analysis (Step 330).

The target process data (Y) and associated quality flag (y) can be parsed from the received data stream and analyzed by the data quality analyzer 142 (shown in FIG. 4) to determine whether the target process data (Y) includes good data or bad data (Step 320). If the quality analyzer 142 determines that the target process data (Y) includes bad data or lost data (NO at Step 320), then a determination can be made to stop updating parameters (Step 325), which causes the update parameters process to stop (Step 340). If, however, it is determined that the process data (Y) includes good data (YES at Step 320), then the good data can be forwarded to the correlation analyzer 144 (Step 330), system modeler 146 (Step 340) or error detector 148 (Step 345).

The correlation analyzer 144 (shown in FIG. 4) can receive the process data (X, Y) from the quality analyzer 142 and analyze or compare the good process data (X) to identify process data (X) that can be correlated with the target process data (Y) (Step 330). In analyzing or comparing the good process data (X), the correlation analyzer 144 can communicate and work with the system modeler 146 (shown in FIG. 4), which can include a black-box, grey-box, white-box identification or another systems identification modeling solution suitable for the control system 1 or structure of interest 40 (shown in FIG. 1). The correlation analyzer 144 can determine and identify process data (X) that is correlated with the target process data (Y), or unrelated to the target process data (Y) (Step 335). If the correlation analyzer 144 identifies unrelated process data (X) (NO at Step 335), then the unrelated process data (X) can be discarded (Step 315), otherwise the correlated process data (X) can be forwarded to the system modeler 146 for system modeling (YES at Step 335, then Step 340) and parameter identification or updating (Step 350). After Step 340, the latest parameters can be passed to the model to be used in estimating the target variable ($\hat{Y}$). The systems modeling can include Step 340 and Step 350 as an integrated process step that is handled by the system modeler 146, or as two separate process steps (shown in FIG. 6A).

In the learning mode, the system modeler 146 can receive the good process data (X) from the correlation analyzer 144 and the good target process data (Y) from the quality analyzer 142 and update the parameters in the system model (Step 340 or Step 350). The process data (X, Y) received by the system modeler 146 (Step 340 or Step 350) can include process data (X) that is relevant or correlated to the target process data (Y). In the estimation mode, the system modeler 146 can receive only the good process data (X) from the quality analyzer 142 (Step 350) along with latest model parameters calculated by the modeler 146 (Step 340), without any target process data (Y).

The switch between learning mode and estimation mode can depend on the presence (or absence) of good target process data (Y). Based on the good process data (X) and good target process data (Y) in the learning mode, the system modeler 146 can use the good process data (X, Y) to train or update the system model, including updating model parameters (Step 340 or Step 350). However, in the estimation mode, where the target process data (Y) contains bad data, the system modeler 146 can use the good process data (X) to generate estimated process data ($\hat{Y}$) (Step 350). The generated estimated process data ($\hat{Y}$) can be transmitted via, for example, the I/O interface 149 to the system server 14 (Step 355).

According to a non-limiting embodiment of the disclosure, the EPD generator 140 can include, for example, an analytics engine (not shown) or a big data engine (not shown) that can scan real-time process data (X, Y) in the database 15 (shown in FIG. 2), classify correlated data readings (for example, Step 330, shown in FIG. 6A), and automatically select a suitable system model (for example, Step 350, shown in FIG. 6A), which can be a model other than, for example, an adaptive neural-network model shown in FIGS. 8A, 8B.

The error detector 148 can receive good process data (Y) from the quality analyzer 142 and estimated process data ($\hat{Y}$) from the system modeler 146 (Step 345). Based on the received good process data (Y) and estimated process data ($\hat{Y}$), the error detector 148 can generate model parameter identification or update data (Step 340) and transmit the parameter data to the system modeler 146 to identify or update the model parameters (Step 340 or Step 350).

Figure 6B:
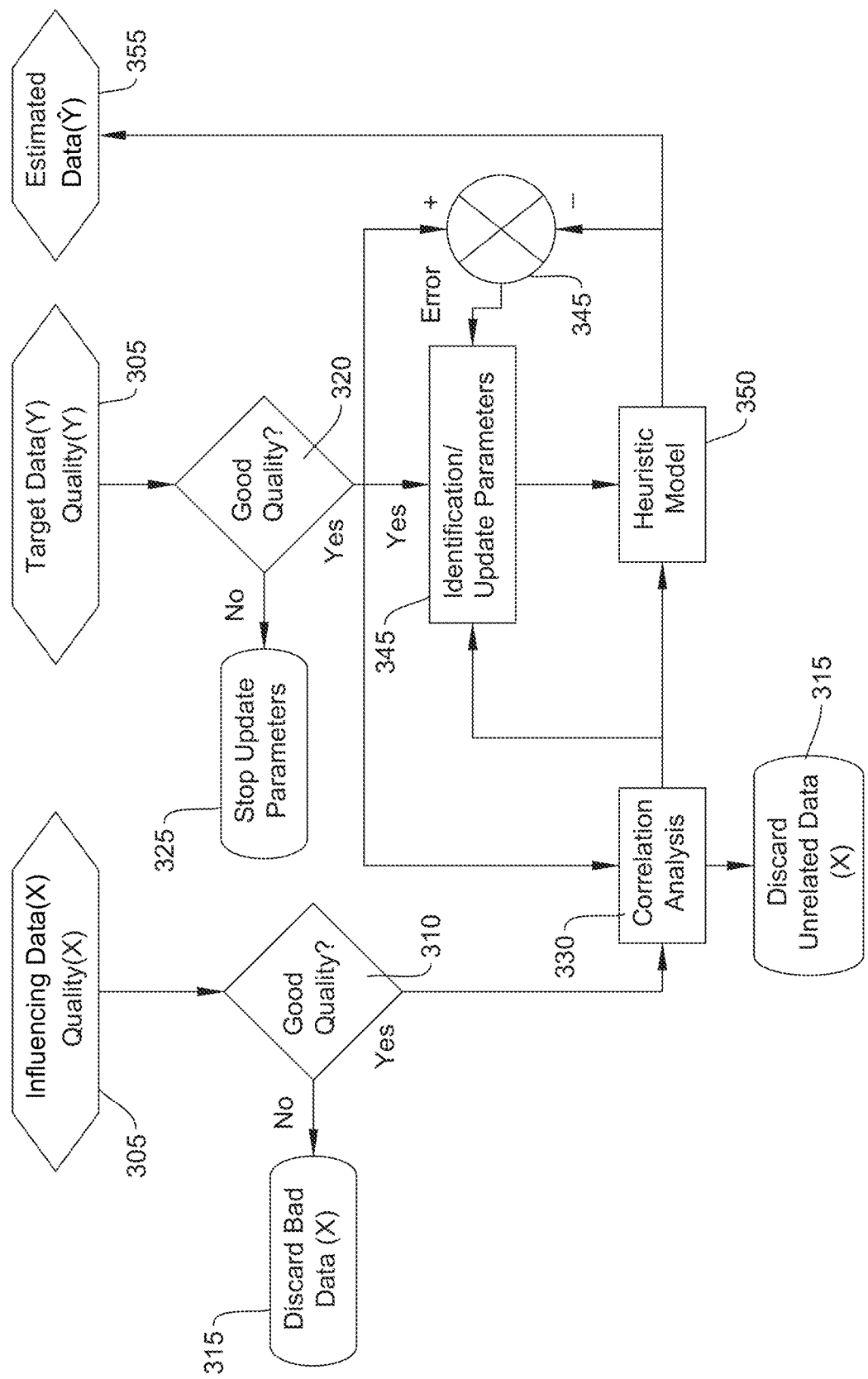
FIG. 6B shows a block diagram of an example of the EPD generation process in FIG. 6A being carried out by an OSI server in the MAC station in FIG. 2.

FIG. 6B shows a block diagram of an example of the EPD generation process 300 being carried out by an OSI server 12 in the MAC station 10 (shown in FIG. 2). As seen in FIG. 6B, a non-limiting embodiment of the EPD generation process 300 can include a heuristic model for the system modeling (Step 350).

Figure 7:
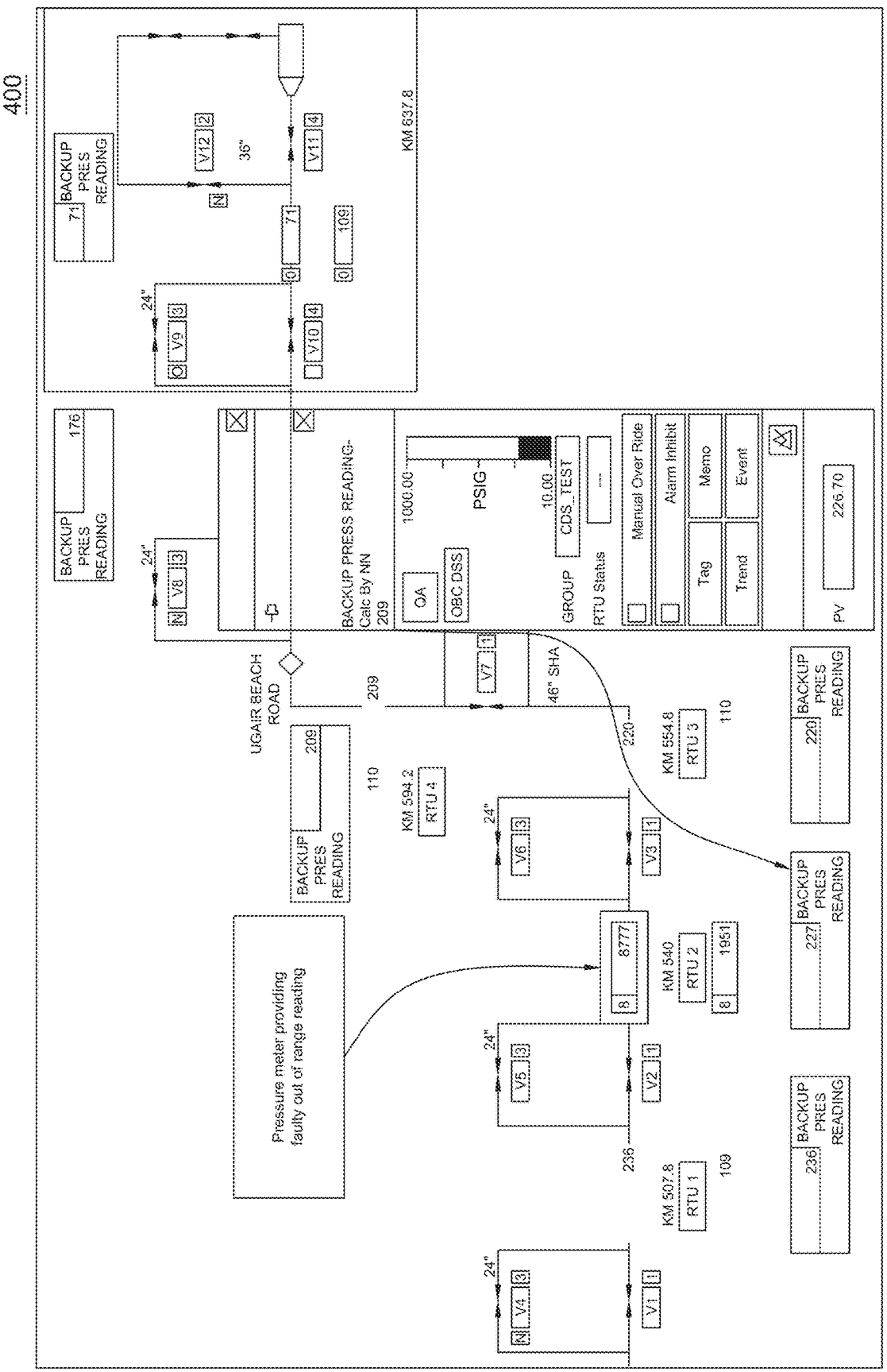
FIG. 7 shows an example of a display screen that can be rendered on a human machine interface (HMI) in the control system in FIG. 1.

FIG. 7 shows an example of a display screen 400 that can be rendered by the HMI 16 (shown in FIG. 2) in the MAC station 10 for the structure of interest 40 (shown in FIG. 1) after receiving process data (X) and estimated process data (Ŷ) from the system server 14. As seen in FIG. 7, the display screen 400 can include a rendering of real-time SCADA pressure readings, such as, for example, an estimated pressure reading 227 to replace a bad pressure meter reading of 8777 at the node 21-*m* that was determined to be faulty or out of range. The display screen 400 can include healthy pressure readings and estimated pressure readings from multiple instances of the system model.

FIGS. 8A and 8B show an example of using a Steepest Decent Algorithm in the control system 1 (shown in FIG. 1) to minimize an LMS function by updating model parameters in an adaptive neural network model, according to the principles of the disclosure. As noted earlier, the adaptive neural network model can be included in the system modeler 146 (shown in FIG. 4).

Referring to FIGS. 1, 8A and 8B, pressure data $P_{11}$, $P_{12}$, and $P_{13}$ can be received from upstream nodes 20-1, 20-2, and 20-3, respectively, and pressure data $P_{21}$, $P_{22}$, and $P_{23}$, can be received from downstream nodes **20-*m*+1, 20-*m*+2, and 20-*n*, respectively, for the segment of the structure of interest 40 (shown in FIG. 1). For the sake of simplicity, this example assumes that only nodes 20-1, 20-2, 20-3, 20-*m*, 20-*m*+1, and 20-*m*+2 are correlated to 20-*n* present in the structure of interest 40. In this example, the pressure reading P for the node 20-*m* is determined to be lost or faulty, and $\overline{P}_1$ and $\overline{P}_2$ represent two inputs to the system model in FIGS. 8A and 8B**, where $$\overline{P_1} = \frac{\sum_{k=1}^{3} P_{1k} * \text{Quality}(P_{1k})}{\sum_{k=1}^{3} \text{Quality}(P_{1k})}; \text{Quality}(P_{1k}) - [0, 1]$$

$$\overline{P_2} = \frac{\sum_{k=1}^{3} P_{2k} * \text{Quality}(P_{2k})}{\sum_{k=1}^{3} \text{Quality}(P_{2k})}; \text{Quality}(P_{2k}) = [0, 1]$$

However, if a six-input system model is implemented instead of the two-input model shown in FIGS. 8A and 8B, then $\overline{P}_1$ and $\overline{P}_2$ can be replaced by the direct use of the good pressure readings among ($P_{11}$, $P_{12}$, $P_{13}$, $P_{21}$, $P_{22}$, $P_{23}$) of nodes 20-1, 20-2, 20-3, **20-*m*, 20-*m*+1, and 20-*m*+2. The averaging technique shown above is used for the sake of simplicity, however it is a non-limiting embodiment of the enclosed system modeling. Referring to FIGS. 4 and 6A, the system modeler 146 can include two, six, or n-input system models. The model parameters and system model (Steps 340 and 350, shown in FIG. 6A) can be dynamically adjusted in accordance to the number of inputs, which can correspond to the number of nodes from which good process data (X) is received by the system server 14 (shown in FIG. 2**).

In FIGS. 8A and 8B, process data $\overline{P}_1$ corresponds to an average of pressure readings received from the upstream nodes 20-1, 20-2, 20-3 and process data corresponds to an average of pressure readings received from the downstream nodes **20-*m*+1, 20-*m*+2, and 20-*n*, both of which can be transmitted to the system model (for example, adaptive neural-network model), which in turn can generate estimated process data P̂. The target process data P and the estimated process data P̂ can be transmitted to the error detector 148 (shown in FIG. 4), which can provide a feedback error signal e to the model in the system modeler 146 to adjust or update the model parameters. The target process data P may include bad data in the process data (Y) received from the node 20-*m* (shown in FIG. 1**).

The neural network shown in FIG. 8B is a three-layer, three-neuron, two-input feedforward neural network that can generate estimated process data P̂ based on input of the process data $\overline{P}_1$ and $\overline{P}_2$. In FIG. 8B, $W_{11}$, $W_{12}$, $W_{13}$, $W_{21}$, $W_{22}$, and $W_{23}$ correspond to weights that multiply the inputs $\overline{P}_1$ and $\overline{P}_2$, the results of which are added and the resultant sums passed to an activation function $f(x)$, where x and W represent an input vector and a weight vector of the neuron, respectively, and $h_1$, $h_2$, and $h_3$ correspond to multipliers applied to the results of the activation functions $f(x)$ in the hidden layer, the results of which are applied to an activation function $f(x)$ in the output layer.

In the example seen in FIGS. 8A and 8B, the pressure data reading P and estimated pressure data P̂ can correspond to the target process data (Y) and generated estimated process data (Ŷ), respectively, discussed above. The pressure reading data $P_{11}$, $P_{12}$, $P_{13}$, $P_{21}$, $P_{22}$, $P_{23}$ can correspond to the process data (X) discussed above with reference to the structure of interest 40 (shown in FIG. 1), which can include a pipeline. The pressure reading data $P_{11}$, $P_{12}$, $P_{13}$, $P_{21}$, $P_{22}$, $P_{23}$ can be considered correlated to the pressure reading P and can be used to feed the system model with process data during model learning (learning mode) and during providing the estimated process data P̂ whenever the pressure data reading P is determined to contain bad data (estimation mode).

Figure 9:
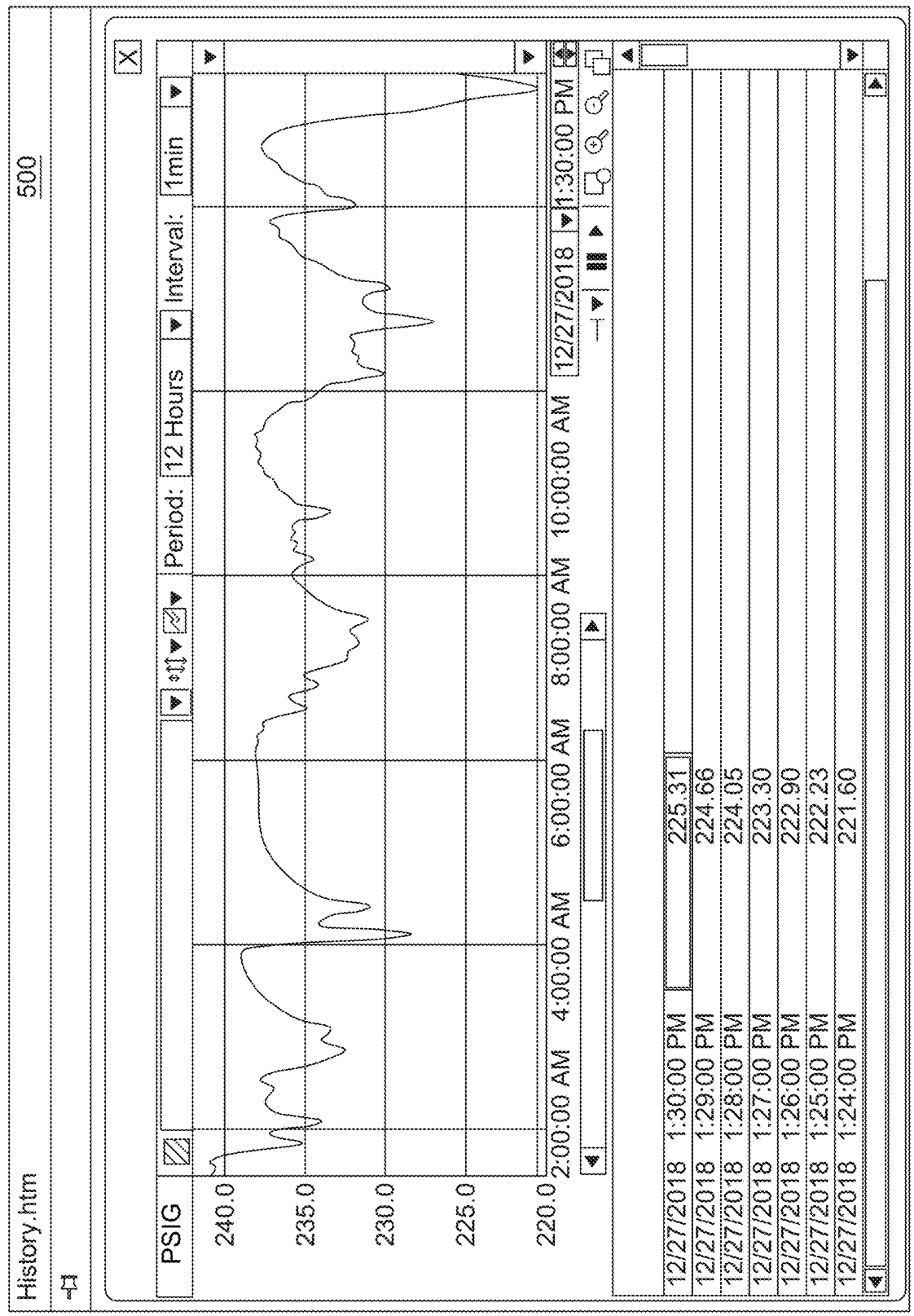
FIG. 9 shows another example of a display screen with 12 hours trend of EPD that can be rendered on the HMI in the control system in FIG. 1.

FIG. 9 shows an example of a display screen 500 that can be rendered by the HMI 16 (shown in FIG. 2). The rendered display screen 500 can include estimated process data (Ŷ) generated by the EPD generator 140 (shown in FIGS. 3, 4) according to the EPD generating process 200 (shown in FIG. 5) or 300 (shown in FIG. 6A). In this example, the estimated process data (Ŷ) includes twelve-hours of estimated pressure reading data for the node **20-*m* (shown in FIG. 1). As seen in FIG. 9**, the estimated process data (Ŷ) varies over time based on influencing variables in, for example, process data (X) within the process.

In network systems such as, for example, SCADA/DCS systems, when field data is lost or bad, system operators may remain unaware of the field data in that location until a maintenance crew fixes the problem, which can take a long period of time. In the control system 1 (shown in FIG. 1), the HMI 16 (shown in FIG. 2) can render both actual and estimated process data, thereby providing the MAC station 10 (shown in FIGS. 1 and 2) and system operators with information that can be used to monitor or control one or more attributes in the structure of interest 40 (shown in FIG. 1). The actual and estimated process data can be provided until, for example, the actual target process data (Y) is restored or contains good data.

Figure 10:
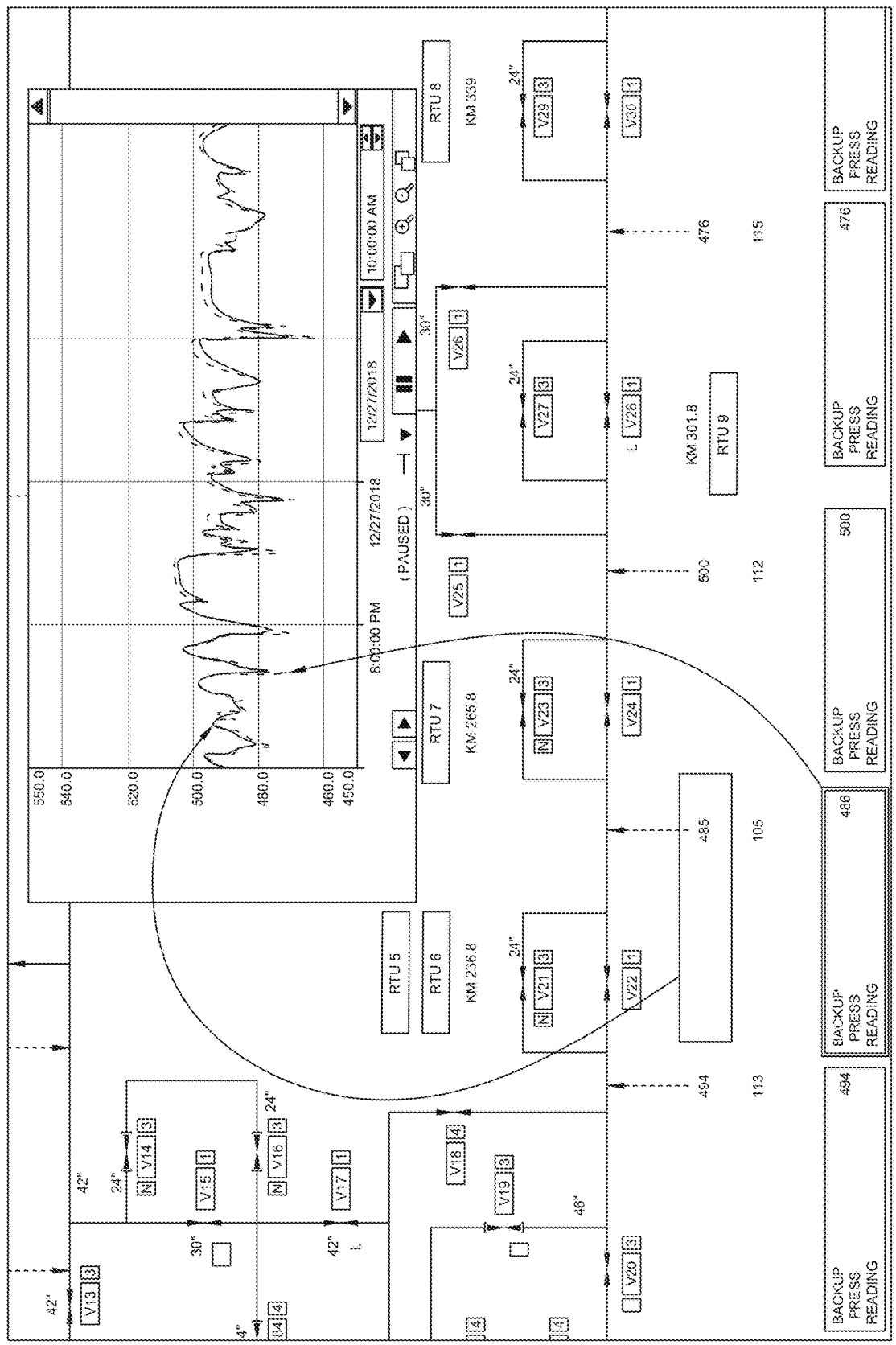
FIG. 10 shows yet another example of a display screen that can be rendered on the HMI in the control system in FIG. 1. The display screen can show an example of a comparison of process data and EPD for validation purposes.

FIG. 10 shows an example of a display screen 600 that can be rendered by the HMI 16 (shown in FIG. 2) in a control system 1 having, for example, thirty-eight (38) nodes spanning over 600 kilometers of pipeline with crude oil flowing in the pipeline structure. In this example, thirty-eight distinct pressure data readings are received from the RTUs 20 by the SCADA/DCS server 14 (via the terminal server 13, shown in FIG. 2). The rendered display screen 600 includes eighteen hours of actual pressure data and estimated pressure data readings ($\hat{Y}$) generated by the EPD generator 140 (shown in FIGS. 3, 4) for the same node, with the OSI processor 100 (shown in FIG. 2) being switched manually from a learning mode to an estimation mode for the sake of model validation.

In FIG. 10, the OSI processor 100 (shown in FIG. 3) is switched manually from a learning mode to an estimation mode, thereby illustrating the accuracy of the OSI processor 100 in generating estimated process data ($\hat{Y}$) for a particular node. In this example, the HMI 16 (shown in FIG. 2) can render a graph showing an actual pressure reading received from a field instrument at a particular node over an extended period of time, which has an actual pressure reading value of "485" at the indicated point in FIG. 10. Concurrently, the OSI processor 100 can provide the HMI 16 (shown in FIG. 2) with estimated pressure reading data to render a graph showing the estimated pressure reading at that same node over the same of time, which has an estimated pressure reading value of "486" at the indicated point in FIG. 10. As seen in FIG. 10, the OSI processor 100 can generate estimated pressure readings ($\hat{Y}$) that are similar to or substantially the same as the actual measured pressure readings (Y) for the same node over an extended period of time (for example, an 18-hour period). In this example, the maximum difference between the estimated process data ($\hat{Y}$) graph and actual process data graph is about 5.2% and the average difference between the graphs is about 0.6%.

In this example, thirty-eight instances of the model are deployed for each pressure data reading. Each model instance operates either in learning mode or in estimation mode. In learning mode, the OSI processor 100 (shown in FIG. 3) updates the model parameters depending on the pressure data reading (Y) and a predefined set of pressure data readings (X) within the pipeline, which are considered to be correlated to the pressure data reading of interest—that is, target process data (Y). Once the pressure data reading of interest is determined to be "bad", the OSI processor 100 (shown in FIG. 3) switches to estimation mode where the OSI processor 100 stops model parameter updates. The OSI processor 100, then, uses the readings of the predefined set of pressure data readings (X) within the pipeline to generate estimated process data ($\hat{Y}$) of the bad data reading. The estimation of the system model for the pipeline, including estimated process data ($\hat{Y}$), can be rendered on the HMI 16 and used to control one or more attributes in the pipeline via, for example, the HMI 16.

The terms "a," "an," and "the," as used in this disclosure, means "one or more," unless expressly specified otherwise.

The term "backbone," as used in this disclosure, means a transmission medium that interconnects one or more computing devices or communicating devices to provide a path that conveys data signals and instruction signals between the one or more computing devices or communicating devices. The backbone can include a bus or a network. The backbone can include an ethernet TCP/IP. The backbone can include a distributed backbone, a collapsed backbone, a parallel backbone or a serial backbone.

The term "communicating device," as used in this disclosure, means any hardware, firmware, or software that can transmit or receive data packets, instruction signals, data signals or radio frequency signals over a communication link. The communicating device can include a computer or a server. The communicating device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G, or 5G cellular standards, or Bluetooth. A communication link can include, for example, an RS-232, RS-422, RS-485, or any other suitable serial interface.

The terms "computer" or "computing device," as used in this disclosure, means any machine, device, circuit, component, or module, or any system of machines, devices, circuits, components, or modules which are capable of manipulating data according to one or more instructions, such as, for example, without limitation, a processor, a microprocessor, a graphics processing unit, a central processing unit, a general purpose computer, a super computer, a personal computer, a laptop computer, a palmtop computer, a notebook computer, a desktop computer, a workstation computer, a server, a server farm, a computer cloud, or an array of processors, microprocessors, central processing units, general purpose computers, super computers, personal computers, laptop computers, palmtop computers, notebook computers, desktop computers, workstation computers, or servers.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read. The computer-readable medium can include a "Cloud," which includes a distribution of files across multiple (for example, thousands of) memory caches on multiple (for example, thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "database," as used in this disclosure, means any combination of software or hardware, including at least one application or at least one computer. The database can include a structured collection of records or data organized according to a database model, such as, for example, but not limited to at least one of a relational model, a hierarchical model, or a network model. The database can include a database management system application (DBMS) as is known in the art. The at least one application may include, but is not limited to, for example, an application program that can accept connections to service requests from clients by sending back responses to the clients. The database can be configured to run the at least one application, often under heavy workloads, unattended, for extended periods of time with minimal human direction.

The term "field instrument," as used in this disclosure, means any device or article, including software, middleware or hardware, that can detect, measure, monitor, manage, control, or adjust an attribute in a structure of interest 40, or that transmit or receive a data signal, a measurement reading signal, or a control or command signal from or to the MAC station 10. A field instrument can include, but is not limited to, for example, an attribute sensor, a valve, a pump, a relay, a switch, a power source, a heating device, a cooling device, a vent, a shutter, a control logic, a programmable logic controller (PLC), an application specific integrated circuit (ASIC), or any actuator or controller.

The terms "including," "comprising" and their variations, as used in this disclosure, mean "including, but not limited to," unless expressly specified otherwise.

The term "network" or "subnetwork," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, or the Internet, any of which can be configured to communicate data via a wireless or a wired communication medium. These networks can run a variety of protocols not limited to TCP/IP, IRC or HTTP.

The term "node," as used in this disclosure, means a physical or virtual location at or near which a computing device, an attribute sensor, or a communicating device is located to sense, measure, monitor, manage or control an attribute in a structure such as, for example, structure 40 (shown in FIG. 1).

The term "server," as used in this disclosure, means any combination of software or hardware, including at least one application or at least one computer to perform services for connected clients as part of a client-server architecture, server-server architecture or client-client architecture. A server can include a mainframe or a server cloud or server farm. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

The term "transmission" or "transmit," as used in this disclosure, means the conveyance of data, data packets, computer instructions, or any other digital or analog information via electricity, acoustic waves, light waves or other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the disclosure.

What is claimed is:

1. A method for monitoring or controlling a field instrument in a pipeline, the method comprising:
   receiving a plurality of process readings which originated from a plurality of remote terminal units that are distributed along a portion of the pipeline;
   correlating the received plurality of process readings to determine a plurality of influencing process readings correlated with a target process reading;
   assessing whether the target process reading includes bad data; and
   generating an estimated process reading or updating a parameter of a system model based on the plurality of influencing process readings and based on whether the target process reading includes bad data.

2. The method in claim 1, further comprising:
   switching between a learning mode and an estimation mode based on whether the target process reading includes bad data.

3. The method in claim 1, wherein the influencing process readings originated at a plurality of influencing remote terminal units located upstream or downstream of a target remote terminal unit.

4. The method in claim 1, wherein the influencing process readings originated at a plurality of influencing remote terminal units located upstream and downstream of a target remote terminal unit.

5. The method in claim 3, wherein assessing whether the target process reading includes bad data comprises determining whether a communication link to the target remote terminal unit is broken or the received target process reading includes a damaged, faulty, or null data packet.

6. The method in claim 1, further comprising:
transmitting the estimated process reading to a human machine interface that renders the plurality of influencing process readings and the estimated process reading on a display device,
wherein the target process reading is replaced by the estimated process reading when the target process reading includes bad data.

7. The method in claim 1, wherein assessing whether the target process reading includes bad data comprises determining the target process reading includes good data.

8. The method in claim 7, further comprising:
correlating the influencing process readings with the target process reading to determine correlated influencing process readings.

9. The method in claim 8, further comprising:
discarding uncorrelated influencing process readings.

10. The method in claim 8, further comprising:
updating the parameter of the system model based on the correlated influencing process readings and the target process reading.

11. The method in claim 6, wherein the human machine interface generates a control signal that is transmitted to a field instrument in the pipeline to adjust an attribute in the pipeline.

12. A system for monitoring or controlling a plurality of field instruments in a pipeline, the system comprising:
an online system identification server that receives a plurality of process readings that originated from a plurality of remote terminal units distributed along a portion of the pipeline and transmits an estimated process reading to a human machine interface, wherein the online system identification server:
correlates the received plurality of process readings to determine a plurality of influencing process readings correlated with a target process reading;
assesses whether the target process reading includes bad data; and
generates an estimated process reading or updates a parameter of a system model based on the plurality of influencing process readings and based on whether the target process reading includes bad data.

13. The system in claim 12, wherein the online system identification server switches between a learning mode and an estimation mode based whether the target process reading includes bad data.

14. The system in claim 12, wherein the influencing process readings originated at a plurality of influencing remote terminal units located upstream or downstream of a target remote terminal unit.

15. The system in claim 12, wherein the target process reading is assessed to include bad data when the target process reading includes a damaged, faulty, or null data packet.

16. The system in claim 12, wherein the online system identification server correlates the influencing process readings with the target process reading to determine correlated influencing process readings.

17. The system in claim 13, wherein the online system identification server comprises:
a correlation analyzer that correlates the influencing process readings with the target process reading; and
a system modeler that updates the parameter of the system model in the learning mode and stops updating the parameter in the system model in the estimation mode.

18. A non-transitory computer readable storage medium storing monitoring or controlling program instructions for causing a field instrument in a pipeline to be monitored or controlled, the program instructions comprising the steps of:
receiving a plurality of process readings that originated from a plurality of remote terminal units that are distributed along a portion of the pipeline;
correlating the received plurality of process readings to determine a plurality of influencing process readings correlated with a target process reading;
assessing whether the target process reading includes bad data; and
generating an estimated process reading or updating a parameter of a system model based on the plurality of influencing process readings and based on whether the target process reading includes bad data.

19. The non-transitory computer readable storage medium in claim 18, the program instructions comprising a further step of:
switching between a learning mode and an estimation mode based on whether the target process reading includes bad data.

20. The non-transitory computer readable storage medium in claim 18, the program instructions comprising a further step of:
transmitting the estimated process reading to a human machine interface that renders the plurality of influencing process readings and the estimated process reading on a display device,
wherein the target process reading is replaced by the estimated process reading when the target process reading includes bad data.

* * * * *